(12) United States Patent
Tian et al.

(10) Patent No.: US 8,780,806 B2
(45) Date of Patent: Jul. 15, 2014

(54) METHOD, APPARATUS, AND SYSTEM FOR COOPERATIVE SCHEDULING AMONG MULTIPLE CELLS

(75) Inventors: Kaibo Tian, Shenzhen (CN); Aihua Peng, Shenzhen (CN); Dong Zhou, Shenzhen (CN); Chenchen Zhang, Shenzhen (CN)

(73) Assignee: ZTE Corporation (CN)

( * ) Notice: Subject to any disclaimer, the term of this patent is extended or adjusted under 35 U.S.C. 154(b) by 174 days.

(21) Appl. No.: 13/387,327

(22) PCT Filed: Dec. 10, 2010

(86) PCT No.: PCT/CN2010/079663
§ 371 (c)(1),
(2), (4) Date: Jan. 26, 2012

(87) PCT Pub. No.: WO2011/072590
PCT Pub. Date: Jun. 23, 2011

(65) Prior Publication Data
US 2012/0127912 A1 May 24, 2012

(30) Foreign Application Priority Data
Dec. 18, 2009 (CN) .......................... 2009 1 0261640

(51) Int. Cl.
*H04W 4/00* (2009.01)
(52) U.S. Cl.
USPC ............ 370/328; 370/315; 370/329; 370/338
(58) Field of Classification Search
CPC ............... H04W 28/021; H04W 84/18–84/22; H04W 72/1226; H04W 52/0216; H04W 72/00; H04W 74/04–74/06; H04W 72/1263–72/1294; H04W 72/12–72/121; H04W 84/045

USPC ...................... 370/310–355; 455/450–454, 7
See application file for complete search history.

(56) References Cited

U.S. PATENT DOCUMENTS

2012/0178484 A1* 7/2012 Liu et al. ....................... 455/513
2012/0281683 A1* 11/2012 Falconetti et al. ............ 370/336

FOREIGN PATENT DOCUMENTS

| CN | 101442808 A | 5/2009 |
| CN | 101577940 A | 11/2009 |
| CN | 101583194 A | 11/2009 |

OTHER PUBLICATIONS

Huang, Zhi, Authorized officer, International Searching Authority, State Intellectual Property Office, P.R. China, International Search Report, PCT Application Serial No. PCT/CN2010/079663; search completion date: Feb. 17, 2011; mail date: Mar. 17, 2011.

(Continued)

*Primary Examiner* — Andrew Chriss
*Assistant Examiner* — Kenan Cehic
(74) *Attorney, Agent, or Firm* — Kolisch Hartwell, P.C.

(57) ABSTRACT

A method of cooperation scheduling among multiple cells applied in a CoMP system is disclosed in the present invention, the method includes: a relay base station in a relay cell receiving the scheduling results of every cell in a cooperation set, wherein the relay cell is one of the cooperation cells in the cooperation set; the relay base station determining whether the scheduling results meets a preset iteration ending condition or not; and if the scheduling result does not meet the iteration ending condition, the relay base station sending rescheduling indication information which carries the scheduling result of every cooperation cell to the cooperation base station in every cooperation cell in the cooperation set, indicating to restart the scheduling of every cooperation cell according to the scheduling results. A base station and a cooperation scheduling system among multiple cells are disclosed in the present invention.

9 Claims, 3 Drawing Sheets

(56) References Cited

OTHER PUBLICATIONS

Liu, "Coordinated Multiple Point Transmission and Reception in LTE-Advanced Systems." Telecommunications Network Technology (2009) No. 9, pp. 5-9.

Shen, "Key Technology Development Trend of LTE-Advanced." Mobile Communication (2008) vol. 2, pp. 20-25.

* cited by examiner

METHOD, APPARATUS, AND SYSTEM FOR COOPERATIVE SCHEDULING AMONG MULTIPLE CELLS

TECHNICAL FIELD

The present invention relates to a mobile communication field, and especially relates to method, apparatus and system for cooperation scheduling among multiple cells.

BACKGROUND OF THE RELATED ART

In recent years, with the fast development of the demand for wireless and mobile communication service, the requirement for performance of future broadband wireless communication is increasing, wherein one important index is the communication rate available to the cell edge users. Because the performance of the cell edge users is restricted by the interference from adjacent cells, multi-cell joint transmission (i.e. multi-cell cooperation sending) is proposed to decrease inter-cell interference. In the system using multi-cell cooperation sending, each base station (BS) may be regarded as virtual antenna, multiple base stations serve one or more users by utilizing the sending technology similar to Multi-Input Multi-Output (MIMO) sending technology, the adjacent cells interference signals then may be converted to useful signals, thus improving the performance of the cell edge users. Inter-downlink-Base Station Coordinated Multiple Point technology (hereinafter referred to CoMP) is introduced in the Long term evaluation-Advanced (LTE-A) system, so as to improve the coverage rate of high speed data rate services and improve average throughput of cell edges and cells.

In current LET-A, COMP technology mainly includes: (1) joint transmission technology, each node in the cooperation transmission set could obtain data information, Physical Downlink Shared Channel data is transmitted through more or one node at the same time; (2) cooperation scheduling: only the service cell can obtain the to-be-transmitted data, however, the scheduling for the users and an acknowledgement for beam-forming is completed by the cooperation set negotiation.

The problem existing in the above-mentioned process of transmitting data using COMP technology is:

There is no cooperation scheduling mechanism among multiple cells at present, the cooperation scheduling using COMP technology could not be carried out.

SUMMARY OF THE INVENTION

A method of cooperation scheduling among multiple cells is provided in the present invention, solving the problem that cooperation scheduling using COMP technology cannot be carried out.

A method of cooperation scheduling among multiple cells, which is applied in Coordinated Multiple Point (CoMP) system among Base Stations (BS), comprising:

a BS in a relay cell receiving a cooperation result of every cooperation cell in a cooperation set, wherein the relay cell is one of cooperation cells in the cooperation set; the BS in the relay cell is called as relay BS while the BSs in the other cooperation cells are called cooperation BSs;

the relay BS determining whether the scheduling result meets a preset iteration ending condition or not; and if the scheduling result does not meet the iteration ending condition, the relay BS sending re-scheduling indication information which carries the scheduling result of every cooperation cell to the cooperation BS in every cooperation cell in the cooperation set, indicating to restart the scheduling for every cooperation cell according to said scheduling result.

After the step of the relay BS determining whether the scheduling result meets the preset iteration ending condition or not, the method further comprising:

if the scheduling result meets the iteration ending condition, the relay BS sending scheduling complete information to the cooperation BS in every cooperation cell in the cooperation set, indicating to end the scheduling of every cooperation cell and utilizing the last scheduling result.

After the step of the relay BS sending the scheduling complete information to the cooperation BS in every cooperation cell in the cooperation set, the method comprising:

the cooperation BS receiving the scheduling complete information sent by the relay BS, utilizing the last scheduling result to perform the scheduling.

After the step of the relay BS sending re-scheduling indication information to the BS of every cooperation cell in the cooperation set, the method further comprising:

the cooperation BS receiving the re-scheduling indication information which carries the scheduling result of every cooperation cell sent by the relay BS in the relay cell;

the cooperation BS calculating new scheduling scheme in order to restart the scheduling according to the scheduling result of every cooperation cell; and the cooperation BS sending the scheduling result to the relay BS.

The iteration ending condition is: the scheduling result of this time being the same as last scheduling result, or the number of times of iteration pre-scheduling being reached, or the cooperation set reaching a performance threshold;

before the step of the relay BS in the relay cell receiving the scheduling result of every cooperation cell in the cooperation set, the method further comprising:

setting the iteration ending condition.

Before the step of the BS in the relay BS receiving the cooperation result of every cooperation cell in cooperation set, the method further comprising:

the cooperation BS receiving the channel measuring information sent by a terminal, performing an initial scheduling;

the cooperation BS sending the scheduling result of the initial scheduling to the relay BS.

A base station (BS) in a Coordinated Multiple Point (COMP) system among the BSs, comprising:

a result receiving module, configured to receive the scheduling result of every cooperation cell in the cooperation set when the BS is the relay BS, wherein the cooperation cell includes a relay cell; the relay BS is the BS in the relay cell;

a determining module, configured to determine whether the scheduling result meets the preset iteration ending condition or not when the BS is relay BS; and a scheduling indication module, configured to send re-scheduling indication information which carries the scheduling result of every cooperation cell to every cooperation cell in the cooperation set when the BS is the relay BS and the scheduling result does not meet the iteration ending condition, indicating to restart the scheduling of every cooperation cell according to said scheduling result.

The BS further comprises:

a scheduling indication receiving module, configured to receive the re-scheduling indication information which carries the scheduling result of every cooperation cell when the BS is the relay BS; wherein the cooperation BS is the BS in the cooperation cells except the relay cell;

a scheduling performing module, configured to calculate new scheduling scheme when the BS is the cooperation BS, so as to restart the scheduling according to the scheduling result of every cooperation cell; and a scheduling result sending module, configured to send the scheduling result after the scheduling performing module restarts the scheduling when the BS is the relay BS.

The scheduling indication module is further configured to send scheduling complete information to the BS of every cooperation cell in the cooperation set when the BS is the relay BS and the scheduling result meets the iteration ending condition, indicating to end the scheduling of every cooperation cell and utilize the last scheduling result;

the scheduling indication receiving module is further configured to receive the scheduling complete information when the BS is the relay BS;

the scheduling performing module is further configured to perform the scheduling using the last scheduling result when the BS is the relay BS and the scheduling indication module has received the scheduling complete information.

A cooperation scheduling system among multiple cells, wherein, in a Coordinated Multiple Point (CoMP) system among multiple cells, said cooperation scheduling system comprises a relay BS and at least one cooperation BS;

the relay BS is configured to receive the scheduling result of every cooperation cell in the cooperation set, wherein the relay cell is one of the cooperation cells in the cooperation set; and determine whether the scheduling result meets the preset iteration ending condition or not, and send re-scheduling indication information which carries the scheduling result of every cooperation cell to cooperation BS in every cooperation cell in the cooperation set when the scheduling result does not meet the iteration ending condition, indicating to restart the scheduling of every cooperation cell according to this scheduling result; the BS is the BS in the relay cell;

The cooperation BS is configured to receive the re-scheduling indication information which carries the scheduling result of every cooperation cell sent by the relay BS, and calculate new scheduling scheme so as to restart the scheduling according to the scheduling result of the every cooperation cell, and send the scheduling result to the relay BS; the cooperation BS is the BS in the cooperation cell except the relay cell.

The relay BS is further configured to send the scheduling complete information to the cooperation BS in every cooperation cell in the cooperation set when the scheduling result meets the preset iteration ending condition, indicating to end the scheduling for every cooperation cell, and utilize the last scheduling result.

Method, apparatus and system of cooperation scheduling among multiple cells are provided in the present invention, a cell is selected from cooperation set as a relay cell, the relay BS in the relay cell receives the scheduling result of every cooperation cell in the cooperation set, and determines whether the scheduling result meets a preset iteration ending condition or not, sends re-scheduling indication information which carries the scheduling result of every cooperation cell to the BS of every cooperation cell in the cooperation set when the scheduling result does not meet the iteration ending condition, indicating to restart the scheduling of every cooperation cell according to this scheduling result, the BS in the cooperation cell calculates a new scheduling scheme according to scheduling result of every cooperation after receiving the re-scheduling indication information, so as to restart the scheduling and send the scheduling result to the relay BS, thus solving the problem that the cooperation scheduling could not be carried out using COMP technology.

PREFERRED EMBODIMENTS OF THE PRESENT INVENTION

The embodiments of present invention will be described in detail in combination with the accompanying figures. It needs to explain that in the case without conflict, the embodiments in the present invention and the features mentioned in the embodiments may be combined in any way.

In order to solve the problem that cooperation scheduling using COMP technology cannot be carried out, a method of cooperation scheduling among multiple cells is provided by the embodiments of the present invention.

The application scene of the embodiment of the present invention is that, there are 3 cooperation cells in a cooperation set field, cooperation cell A, cooperation cell B and cooperation cell C respectively; each cooperation cell supports Multi-User MIMO (MU-MIMO) mode (going through receive port and send port could be carried out using multiple antennas) and Single User-MIMO (SU-MIMO) mode, there are 3 users to be scheduled under each cooperation cell, the to-be-scheduled users of cooperation cell A are user a1, user a2 and user a3 respectively, the to-be-scheduled users of cooperation cell B are user b1, user b2 and user b3 respectively, the to-be-scheduled users of cooperation cell C are user c1, user c2 and user c3 respectively.

Figure 1:
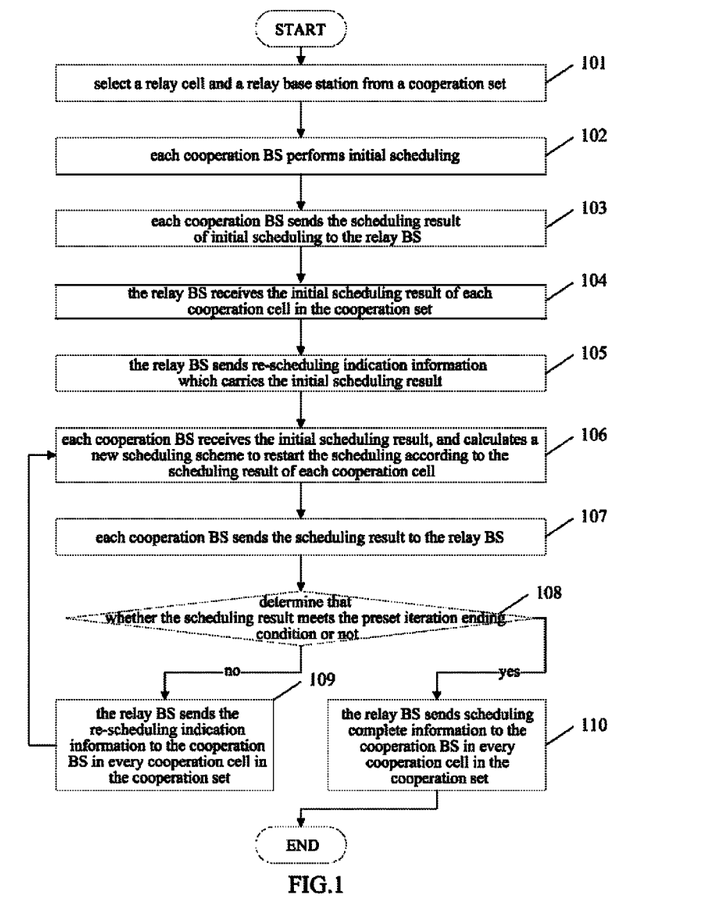
FIG. 1 is a flowchart of a method for cooperation scheduling among multiple cells provided by embodiment of the present invention.

The process of completing the scheduling using the method of cooperation scheduling among multiple cells provided by embodiment of the present invention is shown in FIG. 1, which includes, Step 101, selecting the relay cell and the relay base station from the cooperation set;

In this step, a cell is selected from the cooperation set as the relay cell, the BS in this cell is the relay BS.

There are a plurality of methods for selecting the relay cell, a cooperation cell is selected in cooperation set randomly as the relay cell, or every cooperation cell acts as the relay cell at different cooperation times, or a cell with the relatively less business is selected from all cooperation cells as the relay cell at the different cooperation times, or a cell is designated as the relay cell stably at the time when the system is initialized.

The cooperation cell C is taken as an example to be the relay cell in the embodiment of present invention, the relay BS itself is a cooperation BS, it need to complete the scheduling of the cooperation BS and to report the result.

Step 102, every cooperation BS performing initial scheduling;

In the step, every cooperation cell starts the initial scheduling after receiving the channel measure information sent by its users, the processes of initial scheduling of every cooperation cell are mutual independent and will not be affected by other cooperation cells, the specific process is as below:

The initial scheduling of cooperation cell A is accomplished by the cooperation BS in the cooperation cell A based on an overall condition of equality and present channel state of every to-be-scheduled user. User a2 is scheduled initially, and user a1 and user a3 may be paired (i.e. users a1 and a3 may occupy the same time resource and frequency resource).

The initial scheduling of cooperation cell B is accomplished by the cooperation BS in cooperation cell B based on an overall condition of equality and present channel state of every to-be-scheduled user. User a3 is scheduled initially, and two streams could be sent at the same time (i.e. user a3 could send two ways of data at the same time), there is no matched user to be paired among to-be-scheduled users in this cell, and this scheduling is in SU-MIMO mode.

The initial scheduling of cooperation cell C is accomplished by cooperation BS (i.e. relay BS) in cooperation cell C based on an overall condition of equality and present channel state of every to-be-scheduled user. User c2 and user c3 are scheduled initially in this MU-MIMO mode. The MU-MIMO mode means that multiple users carry out the transmission by using multi-antenna technology.

Step 103, each cooperation BS sending the scheduling results of initial scheduling to the relay BS;

In this step, after the initial scheduling of cooperation cell A, cooperation cell B and cooperation cell C are accomplished, the relay BS has got the scheduling result of cooperation cell C because cooperation cell C is the relay cell, therefore only the cooperation BS of cooperation cell A and cooperation cell B send the scheduling results and related information of the scheduled users to the relay BS.

Step 104, relay BS receiving the initial scheduling result of each cooperation cell in the cooperation set;

In this step, the relay BS receives the scheduling result and save it.

Step 105, the relay BS sending re-scheduling indication information which carries the initial scheduling result;

In this step, the initial scheduling result of each cooperation cell is summarized by the relay BS, the initial scheduling results of all the cooperation cells are sent to each cooperation by the way of sending re-scheduling indication information.

Step 106, each cooperation BS receiving the initial scheduling result, and calculating a new scheduling scheme to restart the scheduling according to the scheduling result of each cooperation cell;

in this step, each cooperation BS calculating the new scheduling scheme to restart the scheduling according to the received scheduling result of the last cooperation scheduling so as to decrease the interference among every cooperation cell, the specific process is as below.

Except the equality and the current channel state of each to-be-scheduled user, the scheduling of cooperation cell B (scheduling user b3, using two streams) and the scheduling of cooperation cell C should be considered by the cooperation BS in cooperation cell A, i.e. the performance lose brought to other cooperation cells could also be considered in case that a certain performance requirement have been met for the local cell, thus accomplishing the initial scheduling of the cell. In the embodiment of the present invention, provide that a severe interference could be formed between user a2 and user c2, user a2 and the first stream of user b3, user c3 and the second stream of user b3. According to the scheduling result of the initial scheduling, the pre-scheduling result of the cooperation BS in cooperation cell A of this time is user a1 and user a3.

Except the equality and the current channel state of each to-be-scheduled user, the scheduling of cooperation cell A (user a2) and the scheduling of cooperation cell C (scheduling user c2 and c3 at the same time) should be considered by the cooperation BS in cooperation cell B at the same time, i.e. the performance lose brought to other cooperation cells could also be considered in case that a certain performance requirement have been met for the local cell, thus accomplishing the initial scheduling of the cell B. The pre-scheduling result is user b2 this time.

Except the equality and the current channel state of each to-be-scheduled user, the scheduling of cooperation cell A (user a2) and the scheduling of cooperation cell B (scheduling user b3, using two streams) should be considered by the cooperation BS in cooperation cell C (i.e. relay BS) at the same time, i.e. the performance lose brought to other cooperation cells could also be considered in case that a certain performance requirement have been met for the local cell, thus accomplishing the initial scheduling of the cell C. The pre-scheduling result is user c1 this time.

Step 107, each cooperation BS sending the scheduling result to the relay BS;

In this step, after the initial scheduling of three cooperation cells, the scheduling result and related information of the scheduling is sent to relay BS.

Step 108, the relay BS determining whether the scheduling result meets the preset iteration ending condition or not;

In this step, after the scheduling information of each cooperation cell is summarized by the relay BS, the relay BS first determines whether the scheduling result meets the preset iteration ending condition or not this time.

There are a plurality of methods for setting an iteration ending condition, e.g. setting that the scheduling result of this time is the same as last scheduling result as the iteration ending condition; when the number of the cooperation cells increases and the number of the to-be-scheduled users increases, the scheduling may be executed multiple times, or two identical scheduling results can not be obtained successively, so that the iteration ending condition may also be that the number of the times for the iteration pre-scheduling is reached or the whole cooperation set meets a certain performance threshold.

In the embodiment of the present invention, that the scheduling result of this time is the same as last scheduling result is set as the iteration ending condition, if the iteration ending condition is met, it is considered that there's no need to continue the cooperation scheduling, proceeding to step 110; if the iteration ending condition is not met, the scheduling should be re-executed, proceeding to step 109.

Step 109, if the scheduling result does not meet the iteration ending condition, the relay BS sending the re-scheduling indication information to the cooperation BS in every cooperation cell in the cooperation set, returning to step 106;

In this step, the relay BS sends re-scheduling indication information which carries the scheduling result of every cooperation cell to each cooperation BS, indicating every cooperation BS to restart the scheduling according to this scheduling result.

Step 110, if the scheduling result meets the iteration ending condition, the relay BS sending scheduling complete information to the cooperation BS in every cooperation cell in the cooperation set;

In this step, the relay BS sends scheduling complete information to each cooperation BS, indicating to end the scheduling of every cooperation cell, utilize the last scheduling result.

In step 109, after the relay BS receives the re-scheduling indication information, the relay BS regulates the scheme of this cooperation scheduling according to the cooperation result of every cooperation cell in last cooperation scheduling, similar to step 106 and 108, specifically, this pre-scheduling result of the cooperation BS of cooperation cell A is user a1 and user a3, which complies with the last scheduling result; this pre-scheduling result of the cooperation BS of the cooperation cell B is user a1 and user b2, which complies with the last scheduling result; this pre-scheduling result of the cooperation BS of cooperation cell C is user a1 and user c2 and c3. After the scheduling has been accomplished, the three cooperation BS send the scheduling result and related information of the scheduled users to the relay BS, the relay BS determines that this scheduling result does not meet the iteration ending condition, then sends re-scheduling indication information which carries the scheduling result of this cooperation scheduling to every cooperation BS. This process may be performed iteratedly until the relay BS determines that the scheduling result of this time meets the iteration ending condition.

Up to now, the process of the method of cooperation scheduling among multiple cells provided by the embodiments of the present invention ends.

Figure 2:
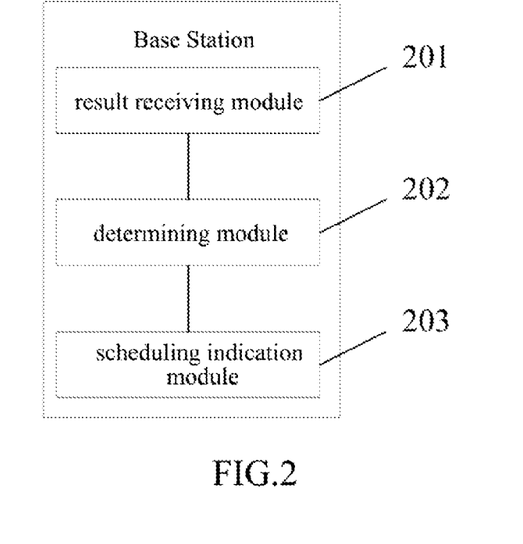
FIG. 2 is schematic structure of a base station provided by an embodiment of the present invention.

A Base Station (BS) is also provided by the embodiment of the present invention, the structure of the BS is shown in FIG. 2, in the CoMP system, the BS includes:

a result receiving module 201, configured to receive the scheduling result of every cooperation cell in the cooperation set, wherein the cooperation cell includes a relay cell;

a determining module 202, configured to determine whether the scheduling result meets a preset iteration ending condition or not;

a scheduling indication module 203, configured to send re-scheduling indication information which carries the scheduling result of every cooperation cell to every cooperation cell in the cooperation set when the scheduling result does not meet the iteration ending condition, indicating to restart the scheduling of every cooperation cell according to this scheduling result.

Figure 3:
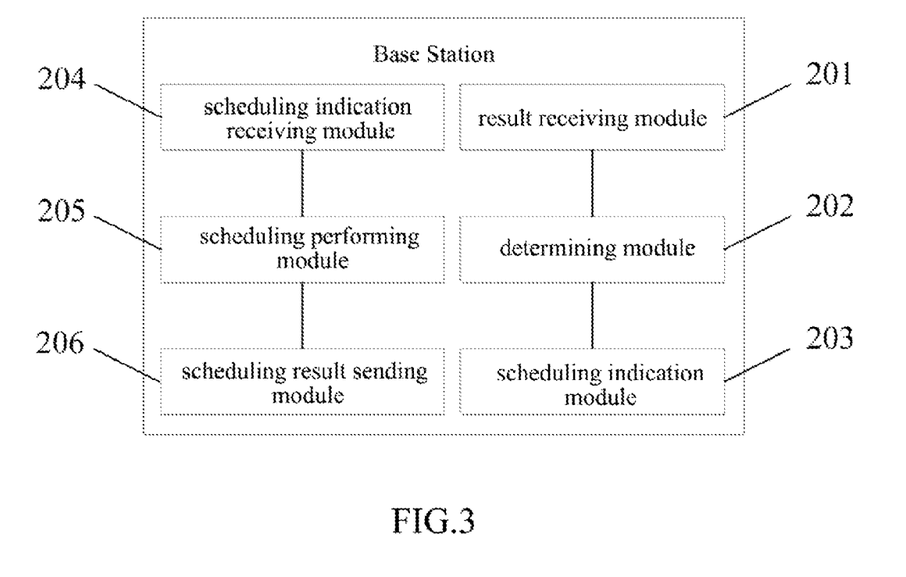
FIG. 3 is schematic structure of a base station provided by another embodiment of the present invention.

Furthermore, as shown in FIG. 3, the above-mentioned BS further includes:

a scheduling indication receiving module 204, configured to receive re-scheduling indication information which carries the scheduling result of every cooperation cell;

a scheduling performing module 205, configured to calculate a new scheduling scheme so as to restart the scheduling according to the scheduling result of every cooperation cell;

a scheduling result sending module 206, configured to send the scheduling result after the scheduling performing module restarts the scheduling.

Furthermore, the scheduling indication module 203 is also configured to send scheduling complete information to every cooperation cell in the cooperation set when the scheduling result meets the iteration ending condition, indicating to end the scheduling of every cooperation cell and utilize the last scheduling result;

The scheduling indication receiving module 204 is also configured to receive the scheduling complete information;

The scheduling performing module 205 is also configured to utilize the last scheduling result to perform the scheduling when the scheduling indication module has received the scheduling complete information.

Figure 4:
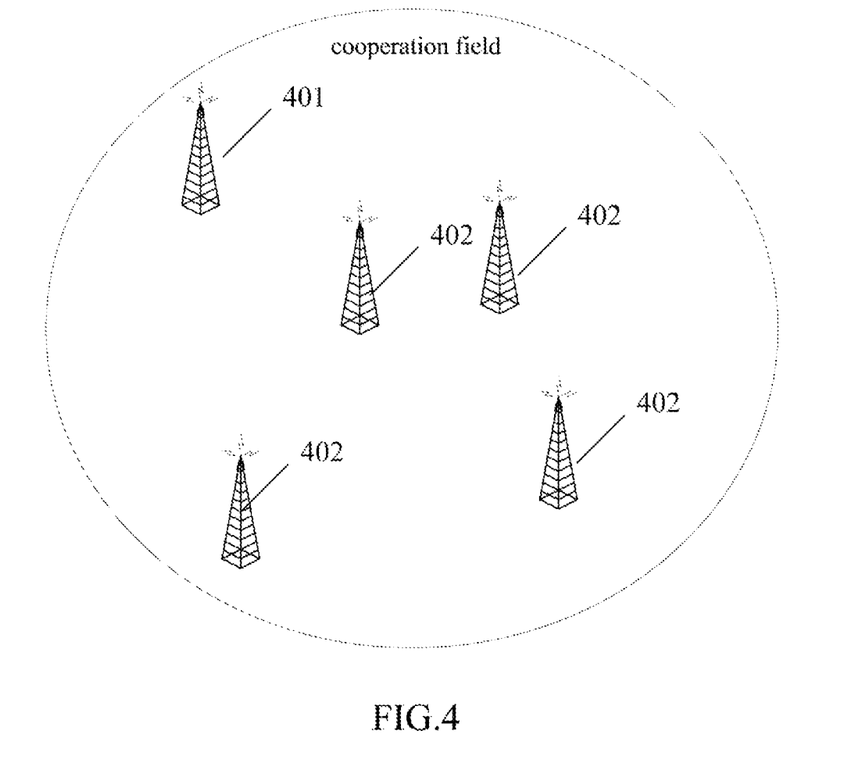
FIG. 4 is schematic structure of a system of cooperation scheduling among multiple cells provided by embodiment of the present invention.

A cooperation scheduling system among multiple cells is also provided by the embodiment of the present invention, the structure of the system is shown in FIG. 4, in a CoMP system, the cooperation scheduling system includes a relay BS 401 and at least one cooperation BS 402;

The relay BS 401 is configured to receive the scheduling result of every cooperation cell in the cooperation set, wherein the relay cell is one of the cooperation cells in the cooperation set; and determine whether the scheduling result meets preset iteration ending condition or not, and send re-scheduling indication information which carries the scheduling result of every cooperation cell to cooperation BS 402 in every cooperation cell in the cooperation set when the scheduling result does not meet the iteration ending condition, indicating to restart the scheduling of every cooperation cell according to this scheduling result;

The cooperation BS 402 is configured to receive the re-scheduling indication information which carries the scheduling result of every cooperation cell sent by the relay BS 401, and calculate a new scheduling scheme so as to restart the scheduling according to the scheduling result of every cooperation cell, and send the scheduling result to the relay BS 501.

Furthermore, the relay BS 401 is also configured to restart the scheduling according to the scheduling result when the scheduling result does not meet the preset iteration ending condition.

The ordinary skilled in the art could understand the all or part of the steps included in the above-mentioned embodiment may be carried out by means of instructing related hardware to complete through program, the program could be stored in a computer-readable storage medium, when perform the program, the program includes one of the steps or combination of the steps in the embodiments of the method.

In addition, each function element in the embodiment of the present invention may be implemented by means of hardware or by means of software function module. The integrated module may be stored in a computer-readable medium when it is implemented by means of software function module and is sold or used as an independent product.

Above-mentioned storage medium may be read-only memory, disk or compact disc.

What is said above is only specific embodiments of present invention, rather than limits the scope of protection of present invention, any skilled of the art could easily be aware of variations or alternatives of the embodiments within the protection scope of the invention. Therefore, the protection scope of the invention shall be determined according to the protection scope of the claims.

INDUSTRIAL APPLICABILITY

The above-mentioned cooperation scheduling system among multiple cells may be combined with a method of cooperation scheduling among multiple cells provided by embodiments of present invention, a cell is selected from cooperation set as a relay cell, the relay BS in the relay cell receives the scheduling result of every cooperation cell in the cooperation set, and determines whether the scheduling result meets a preset iteration ending condition or not, sends re-scheduling indication information which carries the scheduling result of every cooperation cell to the BS of every cooperation cell in the cooperation set when the scheduling result does not meet the iteration ending condition, indicating to restart the scheduling of every cooperation cell according to this scheduling result, the BS in the cooperation cell calculates a new scheduling scheme according to scheduling result of every cooperation after receiving the re-scheduling indication information, so as to restart the scheduling and send the scheduling result to the relay BS, thus solving the problem that the cooperation scheduling could not be carried out using COMP technology.

What is claimed is:
1. A method of coordinated scheduling among multiple cells, applied in a Coordinated Multiple Point (CoMP) system among Base Stations, the method comprising:

selecting a relay Base Station (BS), the relay BS is a BS of a cooperative cell in a cooperative set, and a BS in the other cooperative cells in the cooperative set is called as a cooperative BS;

the relay BS receiving an initial scheduling result of each cooperative cell in the cooperative set, summarizing the initial scheduling result to be an iteration parameter;

the relay BS sending a re-scheduling indication information which carries the summarized initial scheduling result to each of the cooperative BS; and each of the cooperative BS calculating a pre-scheduling scheme to obtain a pre-scheduling result based on a strategy and sending the pre-scheduling result to the relay BS, wherein the strategy is that in addition to the use of the equality and the current channel state of each to-be-scheduled user, the performance loss of other cooperative cells caused by the pre-scheduling of the cooperative cell is also considered;

the BS receiving the pre-scheduling result of each cooperative cell in the cooperative set and summarizing the pre-scheduling result to judge whether the summarized pre-scheduling result meets a preset iteration ending condition or not;

if the preset iteration ending condition is not met, the relay BS taking the summarized pre-scheduling result as a new iteration parameter, sending a re-scheduling indication information which carries the summarized scheduling result to each cooperative BS, indicating it to re-calculate a new scheduling scheme to obtain a new pre-scheduling result based on said strategy and sending the new pre-scheduling result to the relay BS; the relay BS summarizing the new pre-scheduling result to judge whether the summarized new pre-scheduling result meets the preset iteration ending condition;

if the preset iteration ending condition is met, each cooperative cell taking its present pre-scheduling result as its last scheduling result for coordinated scheduling respectively;

wherein, the initial scheduling result and pre-scheduling result comprise one or more scheduled users in each cooperative cell and related information of space-time and/or stream thereof;

the iteration ending condition is: the summarized pre-scheduling result being the same as the iteration parameter, or a number of times for iteration pre-scheduling being reached, or the cooperative set reaching a performance threshold.

2. The method according to claim 1, wherein, if the summarized pre-scheduling result meets the iteration ending condition, the relay BS sending a pre-scheduling complete information to each cooperative BS indicating each cooperative BS to end the pre-scheduling and utilize its present pre-scheduling result as the last scheduling result.

3. The method according to claim 2, further comprising: the cooperative BS receiving the pre-scheduling complete information sent by the relay BS, utilizing the last scheduling result to perform the coordinated scheduling.

4. The method according to claim 1, wherein, before the step of the relay BS receiving the pre-scheduling result of each cooperative cell in the cooperative set, the method further comprising:

setting the iteration ending condition.

5. The method according to claim 1, wherein before the step of the relay BS receiving the initial scheduling result of each cooperative cell in the cooperative set, the method further comprising:

each cooperative BS receiving channel measuring information sent by a terminal to perform initial scheduling, and sending its initial scheduling result to the relay BS.

6. A Base Station (BS), applied in a Coordinated Multiple Point (CoMP) system among Base Stations, the BS comprises a result receiving module, a determining module and a scheduling indication module; wherein, when the BS act as a relay BS, the relay BS is a BS in the relay cell:

the result receiving module is configured to receive an initial scheduling result and pre-scheduling result of each cooperative cell in a cooperative set respectively;

the determining module is configured to summarize the initial scheduling result and pre-scheduling result of each cooperative cell respectively, and determine whether the summarized pre-scheduling result meets a preset iteration ending condition, wherein the summarized initial scheduling result acts as an iteration parameter; and if the summarized pre-scheduling result does not meet a preset ending condition, the summarized pre-scheduling result acts as a new iteration parameter, wherein the preset ending condition is that the summarized result being the same as the iteration parameter, or a number of times for iteration pre-scheduling being reached, or the cooperative set reaching a performance threshold; and the scheduling indication module is configured to send a re-scheduling indication information which carries the summarized scheduling result of each cooperative cell to each cooperative BS in the cooperative set to indicate each cooperative BS to calculate a new pre-scheduling scheme according to the summarized pre-scheduling result if the summarized pre-scheduling result does not meet the iteration ending condition; or send a pre-scheduling complete information to each cooperative BS in the cooperative set to indicate each cooperative BS to end the pre-scheduling and utilize its present pre-scheduling result as a last scheduling result for coordinated scheduling if the summarized result meets the iteration ending condition;

wherein the initial scheduling result and pre-scheduling result comprise one or more scheduled users in each cooperative cell and related information of space-time and/or stream thereof;

the pre-scheduling result of each cooperative cell is obtained based on a strategy that in addition to the use of the equality and the current channel state of each to-be-scheduled user, the performance loss of other cooperative cells caused by the pre-scheduling of the cooperative cell is also considered.

7. The BS according to claim 6, when the BS acts as a cooperative BS, wherein the cooperative BS is a BS in the cooperative cells except the relay cell, further comprising:

a scheduling indication receiving module, configured to receive the re-scheduling indication information which carries the summarized pre-scheduling result of each cooperative cell;

a scheduling performing module, configured to calculate a pre-scheduling scheme to obtain a pre-scheduling result according to the summarized initial result of each cooperative cell;

and calculate a new pre-scheduling scheme to obtain a new pre-scheduling result according to the summarized pre-scheduling result of each cooperative cell when the cooperative BS receives the re-scheduling indications; and a scheduling result sending module, configured to send the initial scheduling result and pre-scheduling result to the relay BS after the scheduling performing module completing the initial scheduling and pre-scheduling respectively.

8. The BS according to claim 7, wherein, the scheduling indication receiving module is further configured to receive the pre-scheduling complete information;

the scheduling performing module is further configured to utilize the last scheduling result to perform the coordinated scheduling when it receives the pre-scheduling complete information.

9. A system for coordinated scheduling among multiple cells, applied in a Coordinated Multiple Point (CoMP) system among Base Stations, comprising a relay Base Station (BS) and at least one cooperative BS, the relay BS is a BS in a relay cell in a cooperative set; a cooperative BS is a BS in the other cooperative cells except the relay cell in the cooperative set; wherein the relay BS is configured to receive an initial scheduling result and a pre-scheduling result of each cooperative cell in a cooperative set respectively, summarize the received initial scheduling result and pre-scheduling result respectively, take the summarized initial scheduling result as an iteration parameter and judge whether the summarized pre-scheduling result meets a preset iteration ending condition:

send re-scheduling indication information which carries the summarized scheduling result to each cooperative BS if the summarized pre-scheduling result does not meet the iteration ending condition, indicating each cooperative BS to calculate a new pre-scheduling scheme according to the summarized pre-scheduling result; or send a pre-scheduling complete information to each cooperative BS, indicating each cooperative BS to utilize its present pre-scheduling result as a last scheduling result for coordinated scheduling if the summarized pre-scheduling result meets the iteration ending condition;

wherein, the initial scheduling result and pre-scheduling result comprise one or more scheduled users in each cooperative cell and related information of space-time and/or stream thereof;

the pre-scheduling result of each cooperative cell is obtained based on a strategy that in addition to the use of the equality and the current channel state of each to-be-scheduled user, the performance loss of other cooperative cells caused by the pre-scheduling of the cooperative cell is also considered;

the iteration ending condition is: the summarized pre-scheduling result being the same as the iteration parameter, or a number of times for iteration pre-scheduling being reached, or the cooperative set reaching a performance threshold;

the cooperative BS is configured to receive the re-scheduling indication information which carries the summarized pre-scheduling result sent by the relay BS, and calculate a new pre-scheduling scheme to obtain a new pre-scheduling result according to the summarized scheduling result and send the pre-scheduling result to the relay BS; utilize its present pre-scheduling result as a last scheduling result to perform coordinated scheduling when receiving the pre-scheduling complete information from the relay BS.

* * * * *